United States Patent
Khare et al.

(10) Patent No.: US 12,262,427 B2
(45) Date of Patent: Mar. 25, 2025

(54) APPARATUS, METHOD AND COMPUTER PROGRAM

(71) Applicant: Nokia Technologies Oy, Espoo (FI)

(72) Inventors: Saurabh Khare, Bangalore (IN); Devaki Chandramouli, Plano, TX (US)

(73) Assignee: NOKIA TECHNOLOGIES OY, Espoo (FI)

(*) Notice: Subject to any disclaimer, the term of this patent is extended or adjusted under 35 U.S.C. 154(b) by 707 days.

(21) Appl. No.: 17/622,921

(22) PCT Filed: Jun. 28, 2019

(86) PCT No.: PCT/EP2019/067481
§ 371 (c)(1),
(2) Date: Dec. 27, 2021

(87) PCT Pub. No.: WO2020/259856
PCT Pub. Date: Dec. 30, 2020

(65) Prior Publication Data
US 2022/0322468 A1   Oct. 6, 2022

(51) Int. Cl.
*H04W 4/00* (2018.01)
*H04W 40/20* (2009.01)
(Continued)

(52) U.S. Cl.
CPC ............ *H04W 76/14* (2018.02); *H04W 40/20* (2013.01); *H04W 48/04* (2013.01); *H04W 88/04* (2013.01); *H04W 92/18* (2013.01)

(58) Field of Classification Search
CPC ..... H04W 76/14; H04W 40/20; H04W 48/04; H04W 88/04
See application file for complete search history.

(56) References Cited

U.S. PATENT DOCUMENTS 10,165,496 B2    12/2018  Ljung et al.
2011/0164555 A1*  7/2011  Yim ................... H04W 72/121
                                                         370/328
(Continued)

FOREIGN PATENT DOCUMENTS

WO    WO 2018/031343 A1    2/2018
WO    WO 2018/129543 A1    7/2018

OTHER PUBLICATIONS

Communication under Rule 71(3) EPC received for corresponding European Patent Application No. 19736639.6, dated Mar. 15, 2024, 8 pages.

(Continued)

*Primary Examiner* — Omoniyi Obayanju
(74) *Attorney, Agent, or Firm* — Robert P. Michal, Esq.; Carter, DeLuca & Farrell LLP (57) ABSTRACT

An apparatus including means for receiving, from a first user equipment associated with a network via a first path, a request at a second user equipment associated with the network, for the second user equipment to act as a relay node for the first user equipment acting as a master node to provide a second path between the first user equipment and the network, wherein the first user equipment and the second user equipment are connected using a proximity service interface, performing, at the second user equipment, an authorisation procedure with the network to act as a relay node for the first user equipment and providing an indication to the first user equipment that the second user equipment is authorised to act as a relay node for the first user equipment.

1 Claim, 7 Drawing Sheets

(51) Int. Cl.
*H04W 48/04* (2009.01)
*H04W 76/14* (2018.01)
*H04W 88/04* (2009.01)
*H04W 92/18* (2009.01)

(56) References Cited

U.S. PATENT DOCUMENTS

| | | |
|---|---|---|
| 2016/0135203 A1 | 5/2016 | Kim et al. |
| 2016/0197927 A1 | 7/2016 | Ma et al. |
| 2017/0055282 A1* | 2/2017 | Sadiq .................. H04W 74/08 |
| 2017/0164332 A1 | 6/2017 | Kim et al. |
| 2017/0366958 A1 | 12/2017 | Ryu et al. |
| 2018/0098370 A1* | 4/2018 | Bangolae .............. H04W 88/04 |
| 2018/0199390 A1 | 7/2018 | Hahn et al. |
| 2018/0279195 A1 | 9/2018 | Kim et al. |

OTHER PUBLICATIONS

"3rd Generation Partnership Project; Technical Specification Group Services and System Aspects; Proximity-based services (ProSe); Stage 2 (Release 15)", 3GPP 23.303 v15.1.0, (Jun. 2018), 130 pages.
International Search Report for Patent Cooperation Treaty Application No. PCT/EP2019/067481 dated Jun. 25, 2020, 19 pages.
Jung et al., "A New Way of Extending Network Coverage: Relay-Assisted D2D Communications in 3GPP", ScienceDirect, ICT Express 2 (Aug. 20, 2016), pp. 117-121.

* cited by examiner

APPARATUS, METHOD AND COMPUTER PROGRAM

RELATED APPLICATION

This application was originally filed as PCT Application No. PCT/EP2019/067481, filed on Jun. 28, 2019, of which is incorporated herein by reference in its entirety.

FIELD

The present application relates to a method, apparatus, system and computer program and in particular but not exclusively to Ultra-reliable low latency communication (URLLC) in 5G.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus, said apparatus comprising means for receiving, from a first user equipment associated with a network via a first path, a request at a second user equipment associated with the network, for the second user equipment to act as a relay node for the first user equipment acting as a master node to provide a second path between the first user equipment and the network, wherein the first user equipment and the second user equipment are connected using a proximity service interface, performing, at the second user equipment, an authorisation procedure with the network to act as a relay node for the first user equipment and providing an indication to the first user equipment that the second user equipment is authorised to act as a relay node for the first user equipment.

The apparatus may comprise means for receiving the request from the first user equipment using the proximity service interface or receiving the request from a proximity function of the network.

The proximity service interface may be PC_5.

Means for performing an authorisation procedure may comprise means for sending an authorisation request from the second user equipment to one of a proximity function of the network or an access and mobility management function of the network and receiving an authorisation response at the second user equipment from the one of the proximity function of the network or the access and mobility management function of the network.

The authorisation request may include at least one of an indication of the identity of the first user equipment, an indication of a communication type between the first user equipment and the second user equipment and an indication of an area where the second user equipment is able to act as a relay node.

The apparatus may comprise means for receiving data from the network addressed to the first user equipment at the second user equipment and providing the data addressed to the first user equipment to the first user equipment from the second user equipment using the proximity service interface.

The data may comprise at least one of replicated protocol data units, replicated control plane signalling, replicated user plane content, control plane signalling, user plane content and non-priority protocol data units.

In a second aspect there is provided an apparatus comprising means for providing, from a first user equipment associated with a network via a first path, a request to at least one second user equipment associated with the network, for the first user equipment to act as a master node to the at least one second user equipment acting as a relay node to provide at least one second path between the first user equipment and the network, wherein the first user equipment and the at least one second user equipment are connected using a proximity service interface, receiving an indication from the at least one second user equipment that the at least one second user equipment is authorised to act as a relay node for the first user equipment and performing, at the first user equipment, an authorisation procedure with the network to act as a master node for the at least one second user equipment.

The apparatus may comprise means for providing the request to the second user equipment using the proximity service interface or via a proximity function of the network.

The proximity service interface may be PC_5.

Means for performing an authorisation procedure may comprise means for sending an authorisation request to one of a proximity function of the network or an access and mobility management function of the network and receiving an authorisation response from the one of the proximity function of the network or the access and mobility management function of the network.

The authorisation request may include at least one of an indication of the identity of the at least one second user equipment, an indication of the proximity service interface between the first user equipment and the second user equipment and an indication of an area where the second user equipment is able to act as a relay node.

The apparatus may comprise means for receiving data addressed to the first user equipment at the first user equipment from the second user equipment using the proximity service interface.

The data may comprise at least one of replicated protocol data units, replicated control plane signalling, replicated user plane content, control plane signalling, user plane content and non-priority protocol data units.

The at least one second user equipment may comprise a plurality of second user equipments and the at least one second path may comprise a plurality of second paths.

In a third aspect there is provided a method comprising receiving, from a first user equipment associated with a network via a first path, a request at a second user equipment associated with the network, for the second user equipment to act as a relay node for the first user equipment acting as a master node to provide a second path between the first user equipment and the network, wherein the first user equipment and the second user equipment are connected using a proximity service interface, performing, at the second user equipment, an authorisation procedure with the network to act as a relay node for the first user equipment and providing an indication to the first user equipment that the second user equipment is authorised to act as a relay node for the first user equipment.

The method may comprise receiving the request from the first user equipment using the proximity service interface or receiving the request from a proximity function of the network.

The proximity service interface may be PC_5.

Performing an authorisation procedure may comprise sending an authorisation request from the second user equipment to one of a proximity function of the network or an access and mobility management function of the network and receiving an authorisation response at the second user equipment from the one of the proximity function of the network or the access and mobility management function of the network.

The authorisation request may include at least one of an indication of the identity of the first user equipment, an indication of a communication type between the first user equipment and the second user equipment and an indication of an area where the second user equipment is able to act as a relay node.

The method may comprise receiving data from the network addressed to the first user equipment at the second user equipment and providing the data addressed to the first user equipment to the first user equipment from the second user equipment using the proximity service interface.

The data may comprise at least one of replicated protocol data units, replicated control plane signalling, replicated user plane content, control plane signalling, user plane content and non-priority protocol data units.

In a fourth aspect there is provided a method comprising providing, from a first user equipment associated with a network via a first path, a request to at least one second user equipment associated with the network, for the first user equipment to act as a master node to the at least one second user equipment acting as a relay node to provide at least one second path between the first user equipment and the network, wherein the first user equipment and the at least one second user equipment are connected using a proximity service interface, receiving an indication from the at least one second user equipment that the at least one second user equipment is authorised to act as a relay node for the first user equipment and performing, at the first user equipment, an authorisation procedure with the network to act as a master node for the at least one second user equipment.

The method may comprise providing the request to the second user equipment using the proximity service interface or via a proximity function of the network.

The proximity service interface may be PC_5.

Performing an authorisation procedure may comprise sending an authorisation request to one of a proximity function of the network or an access and mobility management function of the network and receiving an authorisation response from the one of the proximity function of the network or the access and mobility management function of the network.

The authorisation request may include at least one of an indication of the identity of the at least one second user equipment, an indication of the proximity service interface between the first user equipment and the second user equipment and an indication of an area where the second user equipment is able to act as a relay node.

The method may comprise receiving data addressed to the first user equipment at the first user equipment from the second user equipment using the proximity service interface.

The data may comprise at least one of replicated protocol data units, replicated control plane signalling, replicated user plane content, control plane signalling, user plane content and non-priority protocol data units.

The at least one second user equipment may comprise a plurality of second user equipments and the at least one second path may comprise a plurality of second paths.

In a fifth aspect there is provided an apparatus comprising: at least one processor and at least one memory including a computer program code, the at least one memory and computer program code configured to, with the at least one processor, cause the apparatus at least to: receive, from a first user equipment associated with a network via a first path, a request at a second user equipment associated with the network, for the second user equipment to act as a relay node for the first user equipment acting as a master node to provide a second path between the first user equipment and the network, wherein the first user equipment and the second user equipment are connected using a proximity service interface, perform, at the second user equipment, an authorisation procedure with the network to act as a relay node for the first user equipment and provide an indication to the first user equipment that the second user equipment is authorised to act as a relay node for the first user equipment.

The apparatus may be configured to receive the request from the first user equipment using the proximity service interface or receiving the request from a proximity function of the network.

The proximity service interface may be PC_5.

The apparatus may be configured to send an authorisation request from the second user equipment to one of a proximity function of the network or an access and mobility management function of the network and receive an authorisation response at the second user equipment from the one of the proximity function of the network or the access and mobility management function of the network.

The authorisation request may include at least one of an indication of the identity of the first user equipment, an indication of a communication type between the first user equipment and the second user equipment and an indication of an area where the second user equipment is able to act as a relay node.

The apparatus may be configured to receive data from the network addressed to the first user equipment at the second user equipment and provide the data addressed to the first user equipment to the first user equipment from the second user equipment using the proximity service interface.

The data may comprise at least one of replicated protocol data units, replicated control plane signalling, replicated user plane content, control plane signalling, user plane content and non-priority protocol data units.

In a sixth aspect there is provided an apparatus comprising: at least one processor and at least one memory including a computer program code, the at least one memory and computer program code configured to, with the at least one processor, cause the apparatus at least to: provide, from a first user equipment associated with a network via a first path, a request to at least one second user equipment associated with the network, for the first user equipment to act as a master node to the at least one second user equipment acting as a relay node to provide at least one second path between the first user equipment and the network, wherein the first user equipment and the at least one second user equipment are connected using a proximity service interface, receive an indication from the at least one second user equipment that the at least one second user equipment is authorised to act as a relay node for the first user equipment and perform, at the first user equipment, an authorisation procedure with the network to act as a master node for the at least one second user equipment.

The apparatus may be configured to provide the request to the second user equipment using the proximity service interface or via a proximity function of the network.

The proximity service interface may be PC_5.

The apparatus may be configured to send an authorisation request to one of a proximity function of the network or an access and mobility management function of the network and receive an authorisation response from the one of the proximity function of the network or the access and mobility management function of the network.

The authorisation request may include at least one of an indication of the identity of the at least one second user equipment, an indication of the proximity service interface between the first user equipment and the second user equipment and an indication of an area where the second user equipment is able to act as a relay node.

The apparatus may be configured to receive data addressed to the first user equipment at the first user equipment from the second user equipment using the proximity service interface.

The data may comprise at least one of replicated protocol data units, replicated control plane signalling, replicated user plane content, control plane signalling, user plane content and non-priority protocol data units.

The at least one second user equipment may comprise a plurality of second user equipments and the at least one second path may comprise a plurality of second paths.

In a seventh aspect there is provided a computer readable medium comprising program instructions for causing an apparatus to perform at least the following receiving, from a first user equipment associated with a network via a first path, a request at a second user equipment associated with the network, for the second user equipment to act as a relay node for the first user equipment acting as a master node to provide a second path between the first user equipment and the network, wherein the first user equipment and the second user equipment are connected using a proximity service interface, performing, at the second user equipment, an authorisation procedure with the network to act as a relay node for the first user equipment and providing an indication to the first user equipment that the second user equipment is authorised to act as a relay node for the first user equipment.

The apparatus may be caused to perform receiving the request from the first user equipment using the proximity service interface or receiving the request from a proximity function of the network.

The proximity service interface may be PC_5.

Performing an authorisation procedure may comprise sending an authorisation request from the second user equipment to one of a proximity function of the network or an access and mobility management function of the network and receiving an authorisation response at the second user equipment from the one of the proximity function of the network or the access and mobility management function of the network.

The authorisation request may include at least one of an indication of the identity of the first user equipment, an indication of a communication type between the first user equipment and the second user equipment and an indication of an area where the second user equipment is able to act as a relay node.

The apparatus may be caused to perform receiving data from the network addressed to the first user equipment at the second user equipment and providing the data addressed to the first user equipment to the first user equipment from the second user equipment using the proximity service interface.

The data may comprise at least one of replicated protocol data units, replicated control plane signalling, replicated user plane content, control plane signalling, user plane content and non-priority protocol data units.

In an eighth aspect there is provided a computer readable medium comprising program instructions for causing an apparatus to perform at least the following providing, from a first user equipment associated with a network via a first path, a request to at least one second user equipment associated with the network, for the first user equipment to act as a master node to the at least one second user equipment acting as a relay node to provide at least one second path between the first user equipment and the network, wherein the first user equipment and the at least one second user equipment are connected using a proximity service interface, receiving an indication from the at least one second user equipment that the at least one second user equipment is authorised to act as a relay node for the first user equipment and performing, at the first user equipment, an authorisation procedure with the network to act as a master node for the at least one second user equipment.

The apparatus may be caused to perform providing the request to the second user equipment using the proximity service interface or via a proximity function of the network.

The proximity service interface may be PC_5.

Performing an authorisation procedure may comprise sending an authorisation request to one of a proximity function of the network or an access and mobility management function of the network and receiving an authorisation response from the one of the proximity function of the network or the access and mobility management function of the network.

The authorisation request may include at least one of an indication of the identity of the at least one second user equipment, an indication of the proximity service interface between the first user equipment and the second user equipment and an indication of an area where the second user equipment is able to act as a relay node.

The apparatus may be caused to perform receiving data addressed to the first user equipment at the first user equipment from the second user equipment using the proximity service interface.

The data may comprise at least one of replicated protocol data units, replicated control plane signalling, replicated user plane content, control plane signalling, user plane content and non-priority protocol data units.

The at least one second user equipment may comprise a plurality of second user equipments and the at least one second path may comprise a plurality of second paths.

In a ninth aspect there is provided a non-transitory computer readable medium comprising program instructions for causing an apparatus to perform at least the method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
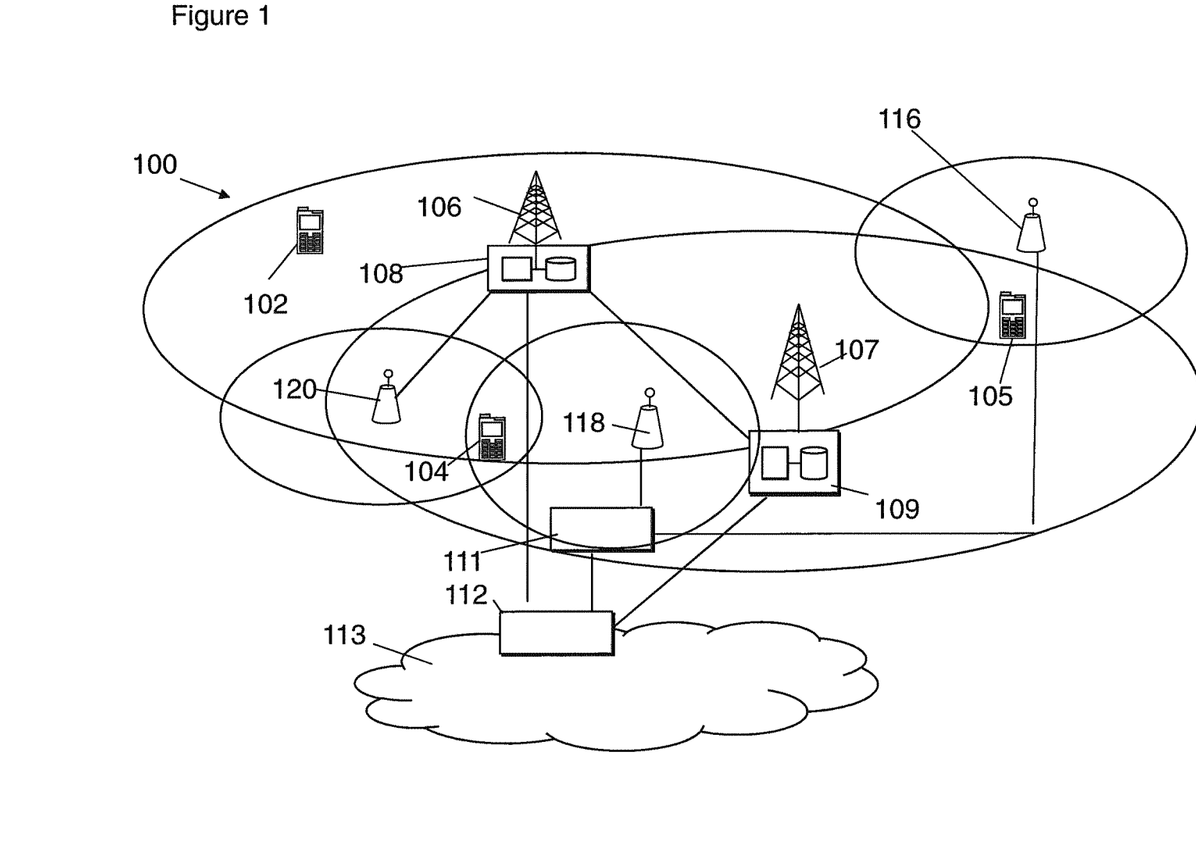
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). An UPF (User Plane Function) whose role is called PSA (PDU Session Anchor) may be responsible for forwarding frames back and forth between the DN (data network) and the tunnels established over the 5G towards the UE(s) exchanging traffic with the DN.

The UPF is controlled by an SMF (Session Management Function) that receives policies from a PCF (Policy Control Function). The CN may also include an AMF (Access & Mobility Function).

Figure 2:
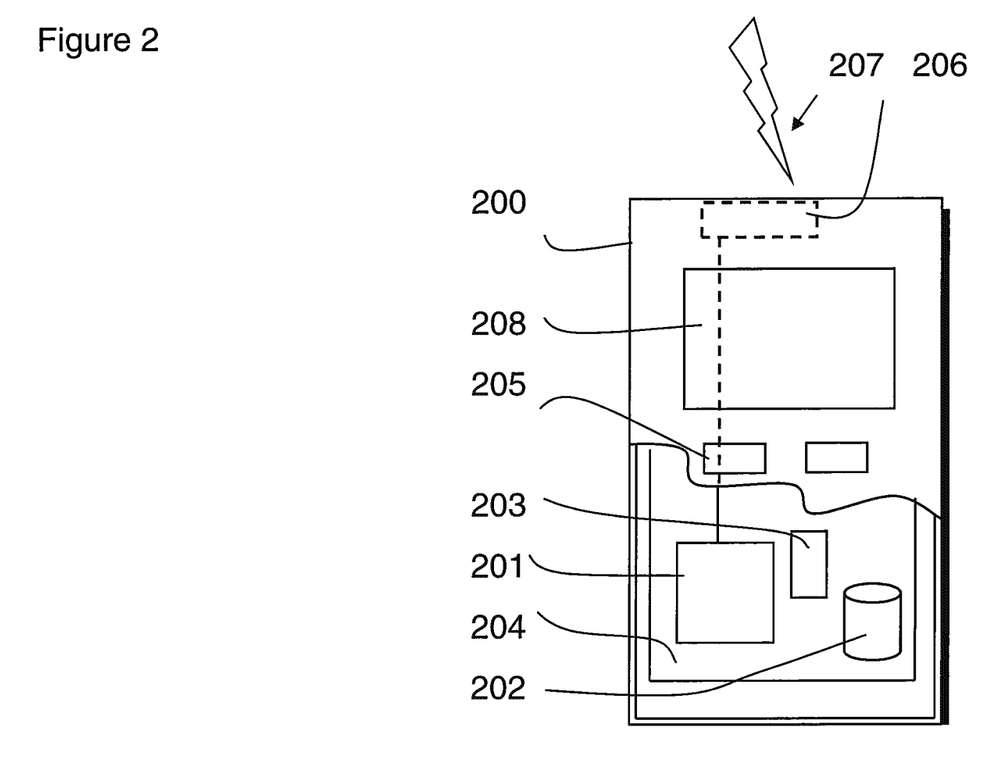
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
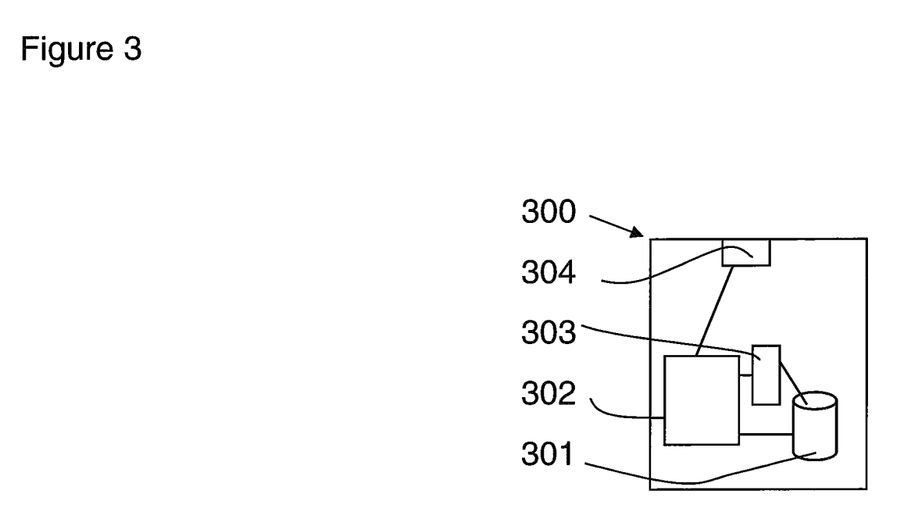
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

5G has raised many new requirements to support different reliable communication or ultra-reliable communication. Ultra-Reliable Low Latency Communications (URLLC) is a feature of 5G that may enable support of emerging applications in different verticals beyond conventional telecommunication services. The targeted use cases of URLLC include various delay-sensitive applications such as tactile internet, autonomous driving, and smart factories.

One way to achieve ultra-reliability for PDU (Protocol Data Unit) sessions is to duplicate the PDU sessions. However, replicating the PDU session on the same path between a transmitter and a receiver may not make communication more reliable. For example, if a UE is connected in a network and there is some issue in the radio or coverage, then replicating the PDU session on the same radio or path will not help. Similar problem may exists for mobility management using a session management message. If there is a loss in radio, reliability may not be achieved. A similar problem arises when UE network coverage is poor, in those cases reliability may be a challenge.

For a device with one or more chipsets (e.g. a dual-SIM) then two session or mobility messages may be duplicated over two or more different radio paths. In future, devices which need ultra-ultra-reliability, may opt for this option. However still there will be gaps, as all the devices will not support dual chipsets (dual SIM).

Figure 4:
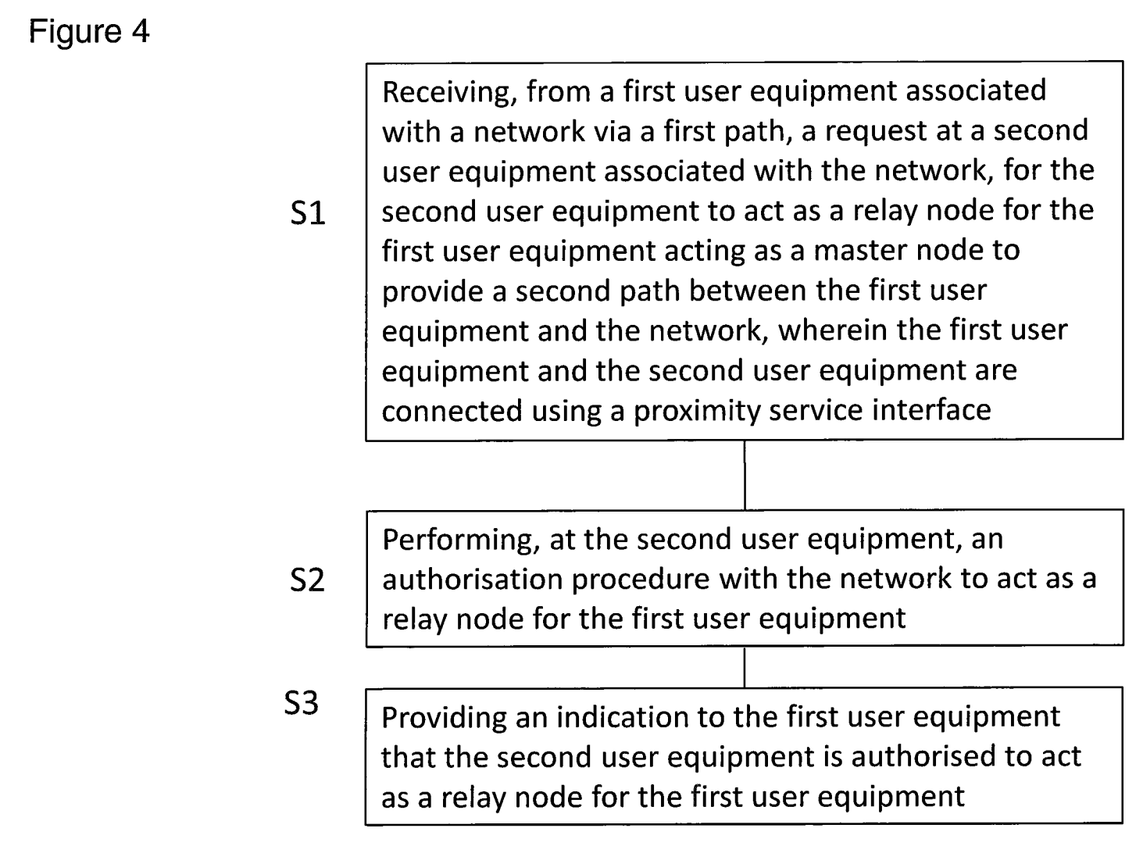
FIG. 4 shows a flowchart of a method according to an example embodiment.

FIG. 4 shows a flowchart of a method according to an example embodiment.

In a first step, S1, the method comprises receiving, from a first user equipment associated with a network via a first path, a request at a second user equipment associated with the network, for the second user equipment to act as a relay node for the first user equipment acting as a master node to provide a second path between the first user equipment and the network, wherein the first user equipment and the second user equipment are connected using a proximity service interface.

In a second step, S2, the method comprises performing, at the second user equipment, an authorisation procedure with the network to act as a relay node for the first user equipment.

In a third step, S3, the method comprises providing an indication to the first user equipment that the second user equipment is authorised to act as a relay node for the first user equipment.

The method of FIG. 4 may be performed at the second user equipment.

Figure 5:
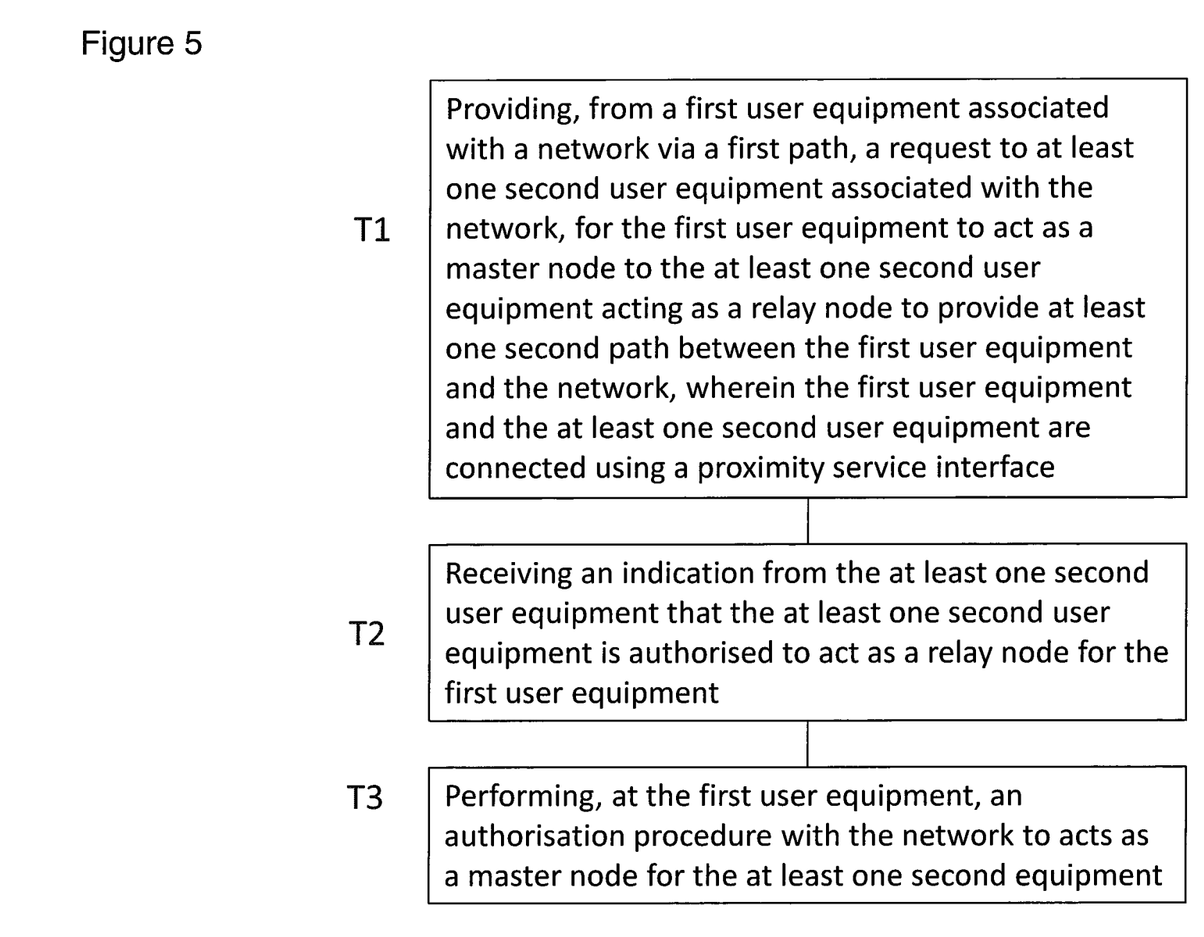
FIG. 5 shows a flowchart of a method according to an example embodiment.

FIG. 5 shows a flowchart of a method according to an example embodiment.

In a first step, T1, the method comprises providing, from a first user equipment associated with a network via a first path, a request to at least one second user equipment associated with the network, for the first user equipment to act as a master node to the at least one second user equipment acting as a relay node to provide at least one second path between the first user equipment and the network, wherein the first user equipment and the at least one second user equipment are connected using a proximity service interface.

In a second step, T2, the method comprises receiving an indication from the at least one second user equipment that the at least one second user equipment is authorised to act as a relay node for the first user equipment.

In a third step, T3, the method comprises performing, at the first user equipment, an authorisation procedure with the network to act as a master node for the at least one second user equipment.

The method of FIG. 5 may be performed at the first user equipment.

The proximity service interface may be PC_5 and use any other suitable device-to-device (D2D) communication type, such as Wifi, E-UTRAN sidelink communication, NR-sidelink communication, Bluetooth, etc. For example, the first user equipment (referred to as UE1) and the second user equipment (referred to as UE2) may be connected via PC_5 (Proximity Service internal UE communication).

When acting as a relay node, UE2 may be considered a Slave node and UE1 may be considered a Master node.

The network may comprise a proximity function, e.g. a ProSe function.

The method may comprise receiving the request from the first user equipment using the proximity service interface. That is, UE1 may ask UE2 over PC_5 if UE2 can act as Slave or Relay for UE1 as Master.

Alternatively, or in addition, the method may comprise receiving the request from a proximity function of the network. For example, UE1 may ask ProSe Function if UE2 can act as Slave for UE1 over PC5. The ProSe Function may authorize and initiate the request towards UE2 to confirm this.

Performing an authorisation procedure with the network may comprise sending an authorisation request to a proximity function of the network or AMF. NAS or ProSe authorization may be performed with a field in an existing message or a message DemandSlaveFunction.

Once the authorisation procedure is performed, i.e. once the network authorizes UE2, UE2 notifies the same to UE1 over PC_5, i.e., UE2 provides an indication to UE1 that UE2 is authorised to act as a relay node for a second path between UE1 and the network.

The method may comprise performing an authorisation procedure between UE1 and the network. The authorisation procedure performed at the first user equipment with the network may comprise sending an authorisation request to a proximity function of the network or AMF. UE1 asks network authorization from AMF or ProSe function. NAS or ProSe authorization is performed by providing a request from the first user equipment to the network comprising a flag or message DemandMasterFunction and an indication of UE2 identity. Network registers the UE2 identity as a relay/slave node providing an alternative path to UE1. This information is updated in AMF and SMF/UPF. UE1 is informed about the successful authorization.

The authorisation request sent from UE1 or UE2 may include at least one of an indication of the identity of the second user equipment or the first user equipment, respectively, and an indication of a communication type between the first user equipment and the second user equipment.

The authorisation request sent from UE1 or UE2 may include an indication of an area where UE1 is able to act as a master node and UE2 is able to act as a relay node, respectively. The indication of the area may comprise a TAI or TAI list.

That is, while negotiating and obtaining authorization with the network, UE1 and UE2 may indicate the location (e.g., a particular TAI or TAI list) where they can act as master/slave. The network may then ensure that the alternative path is used only when both the UEs are located in the same TAI/TAI list as negotiated. This may avoid using network resources to relay via UE2 when the two UE(s) are far apart from each other.

UE1 may then use the second path (via UE2) for communication with the network.

The second, or alternative, path may be used for PDU session replication, paging for reliable content delivery, or any message replication of MT Control plane signaling/UP content delivery over alternative path or MT Control plane signaling/UP content. The second path may also be used for non-priority PDUs.

The method may comprise receiving data from the network addressed to the first user equipment at the second user equipment and providing the data addressed to the first user equipment to the first user equipment using the proximity service interface.

That is, if UE2 receives a message destined for UE1, UE2 relays the message to UE1 using PC_5.

It is assumed that the UE1 and UE2 have independent credentials and subscriptions with the network.

Figure 6:
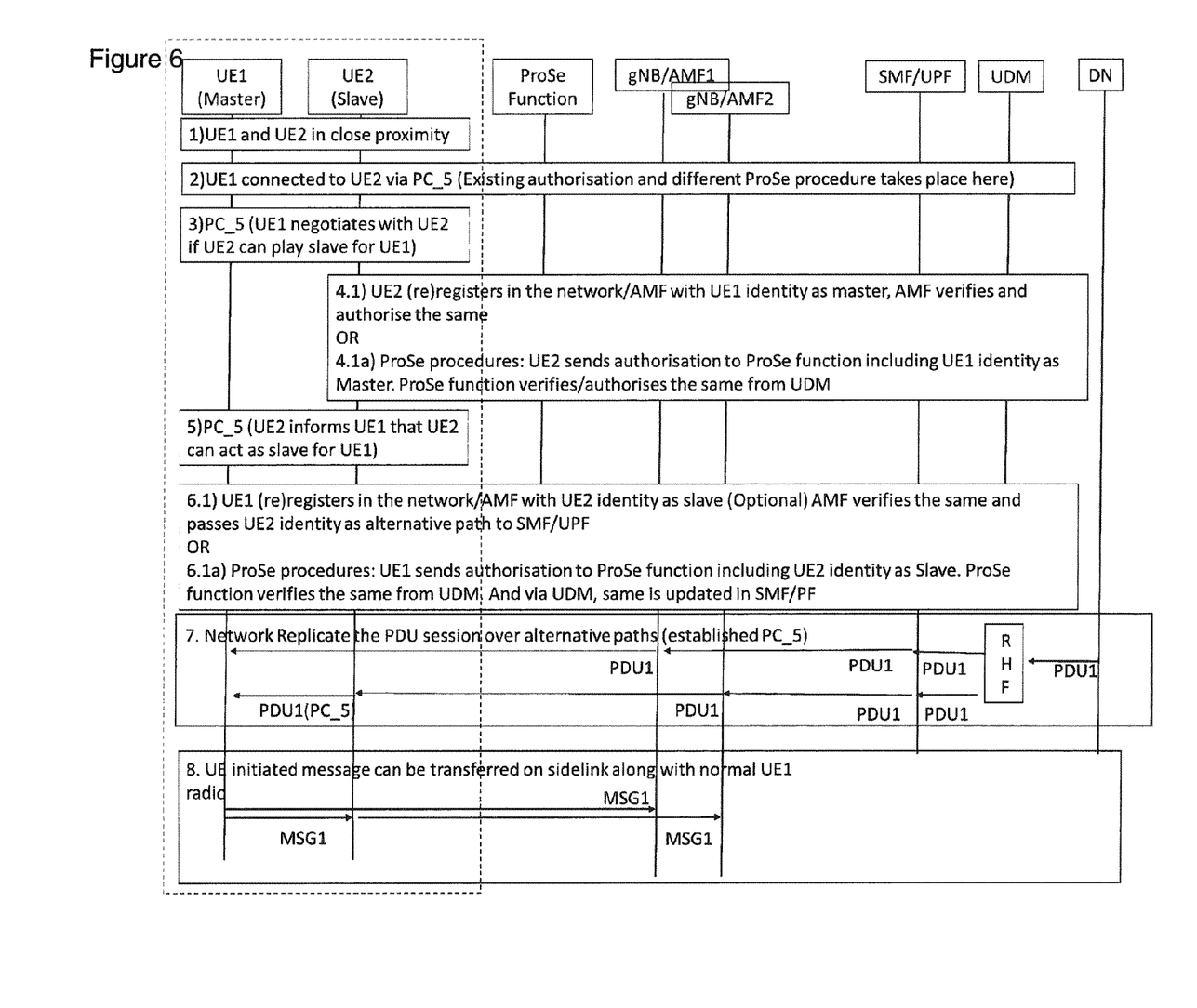
FIG. 6 shows a signalling flow between UE1, UE2 and functions of a network.

FIG. 6 shows a signalling flow according to an example embodiment.

In this example, UE1 is a vehicle UE (Master), and UE2 (Slave/Relay) is a phone device used by driver of the vehicle. An alternative use case may be two robots UEs installed in a factory, in nearby locations. Based on proximity and fixed location, UE2 may connect to UE1 via different options available in Proximity services over PC_5 (wifi, E-UTRAN side link or NR side link). Another use case may be a phone (master) and tablet (slave/relay) used by the user.

In the first step UE1 is in proximity of UE2.

In the second step, UE1 and UE2 connect to each over via PC_5. Existing proximity services procedures defined in 3GPP 23303 may be used for discovery and making PC_5 connections.

In the third step, UE1 requires reliability. It requests that UE2 become a relay node, or slave node, where UE1 is the Master node. An existing PC_5 message with a flag "DemandSlaveFunction" may be used between the two UEs or a new message may be defined which requests Slave-Function from UE2.

In a fourth step, upon receiving the DemandSlavefunction request, UE2 sends a NAS message towards AMF having field "DemandSlaveFunction", MasterIdentity="UE1" and "PC_5_METHOD=E_UTRAN Sidelink/NR Sidelink/etc". This step is shown in FIG. 6 as step 4.1.

AMF may verify the NAS message via different means. In a first option, subscription data received from HSS (Home Subscriber Server)/UDM (Unified Data Management function) based verification for UE2 may be used to verify that UE2 can act as slave/relay for UE1. In a second option, the AMF may verify the UE2 based on operator policy locally configured in AMF, etc. In a third option, the AMF may contact HSS/UDM to verify the message. Once AMF verification is successful, AMF acknowledges the successful verification to UE2 via NAS (Non-Access Stratum) procedures.

In an alternative fourth step, shown as 4.1a in FIG. 6, upon receiving the DemandSlaveFunction request, UE2 may use existing ProSe authorization procedure with "Demand-SlaveAuthorization", MasterIdentity=UE1 and "PC_5_METHOD=E_UTRAN Sidelink/NR Sidelink/etc". ProSe function may authorize the request from subscription data received from HSS/UDM. In this example, once authorization is successful, the ProSe function sends an acknowledgement to UE2.

In a fifth step, UE2 informs UE1 that UE2 may be used as slave/relay node for UE1. This information may be any PC_5 message having indication "DemandForSlaveGranted". The information may be a reply to previous request of "Demand SlaveFunction"

In one option for a sixth step, shown in FIG. 6 as step 6.1, UE1 (Master node) sends NAS procedures towards AMF having a field "DemandMasterFunction", SlaveIdentity="UE2" and "PC_5_METHOD=E_UTRAN Sidelink/NR Sidelink/etc." AMF verifies the message via different means as described above with respect to the NAS message received from UE2

Once AMF verification is successful, AMF acknowledge the successful verification to UE1 via NAS procedures. UDM/AMF also updates the SMF/UPF so that SMF/UPF can use UE2 (slave/relay) as a second path to send any network data (for example, a PDU session).

In an alternative sixth step, shown as step 6.1a in FIG. 6, the UE1 (Master) uses the existing ProSe authorization procedure with "DemandMasterAuthorization", SlaveIdentity=UE1 and "PC_5_METHOD=E_UTRAN Sidelink/NR Sidelink/etc". ProSe function authorizes the request from subscription data received from HSS/UDM. Once authorization is successful, ProSe function sends acknowledgement to UE1.

ProSe function updates the same in UDM and UDM also updates the SMF/UPF so that SMF/UPF can use UE2 (slave/relay) as secondly path to send any network data (example PDU session).

The replication of PDU may then be sent via the second, alternative path.

At the time of PDU Session establishment request for UE-1 for a certain DNN (Data Network Name)+S-NSSAI (Single Network Slice Selection Assistance Information) combination, the network may authorize two paths for UE-1.
1) PSA UPF→RAN→UE1
2) PSA UPF→RAN→UE2→UE1.

Once the network has data to send to UE1, the UPF transmits packets towards UE1 via both path 1) and 2). UPF selects both paths to send data, replicating the packets over UE2 link. When UE2 receives a data from network, UE2 knows it is destined for UE1, and forwards the data to UE1.

Control signalling (paging) message may also be relayed to UE1 via UE2.

When UE1 has data to send to the network, UE 1 may replicate the data over 2 paths. The second path can also be used for any normal message transfer.

Although in the example described above, the Master node has one Slave node, there may be multiple slave or relay nodes for one master. The at least one second user equipment may comprise a plurality of user equipments and the at least one second path may comprise a plurality of second paths. The network architecture may be arranged such that there are multiple UEs in a path to reach the master UE. That is, multiple UEs may come together to form an ultra-reliable network.

Figure 7:
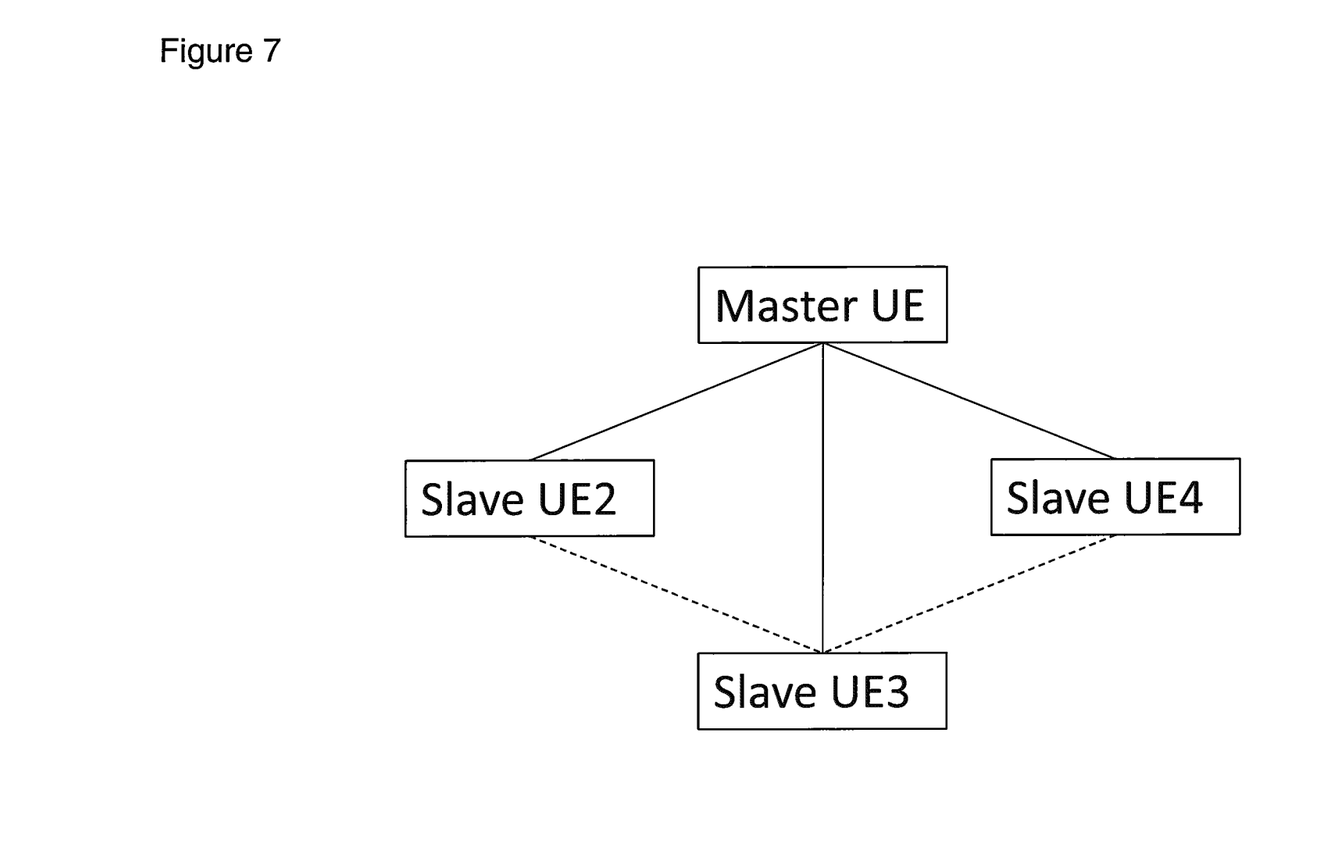
FIG. 7 shows a schematic diagram of a Master/Slave node architecture.

FIG. 7 shows a schematic diagram of a network where UE2, UE3 and UE4 are slave nodes for a master UE. In this example, to reach the master UE, there are multiple paths, either directly between the Master UE and UE2, UE3 or UE 4 or from UE3 to the Master UE via UE2 or UE4.

The architecture as described with reference to FIG. 7 may provide ultra-ultra reliable communication. This may be used in many ultra-reliable scenarios.

This mechanism may enhance reliability by creating alternative path(s) between a UE and a network.

The method may be implemented in a communication device 200, e.g., a user equipment, as described with reference to FIG. 2 or a control apparatus 300 as described with reference to FIG. 3.

An apparatus may comprise means for receiving, from a first user equipment associated with a network via a first path, a request at a second user equipment associated with the network, for the second user equipment to act as a relay node for the first user equipment acting as a master node to provide a second path between the first user equipment and the network, wherein the first user equipment and the second user equipment are connected using a proximity service interface, performing, at the second user equipment, an authorisation procedure with the network to act as a relay node for the first user equipment and providing an indication to the first user equipment that the second user equipment is authorised to act as a relay node for the first user equipment.

Alternatively, or in addition, an apparatus may comprise means for providing, from a first user equipment associated with a network via a first path, a request to at least one second user equipment associated with the network, for the first user equipment to act as a master node to the at least one second user equipment acting as a relay node to provide at least one second path between the first user equipment and the network, wherein the first user equipment and the at least one second user equipment are connected using a proximity service interface, receiving an indication from the at least one second user equipment that the at least one second user equipment is authorised to act as a relay node for the first user equipment and performing, at the first user equipment, an authorisation procedure with the network to act as a master node for the at least one second user equipment.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to URLLC, similar principles can be applied in relation to other networks and communication systems where packet duplication is performed. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. A second user equipment, said second user equipment comprising means for:
receiving, from a first user equipment associated with a network via a first path, a request at the second user equipment associated with the network, for the second user equipment to act as a relay node for the first user equipment acting as a master node to provide a second path between the first user equipment and the network, wherein the first user equipment and the second user equipment are connected using a proximity service interface, wherein the proximity service interface is PC_5, and wherein the request is received from the first user equipment using the proximity service interface or the request is received via a proximity function of the network, wherein the request comprises a flag or message DemandMasterFunction;

performing, at the second user equipment, an authorisation procedure with the network to act as a relay node for the first user equipment, wherein means for performing the authorisation procedure comprises means for sending an authorisation request from the second user equipment to one of the proximity function of the network or an access and mobility management function of the network and receiving an authorisation response at the second user equipment from the one of the proximity function of the network or the access and mobility management function of the network, wherein the authorisation request includes an indication of the identity of the first user equipment, an indication of a communication type between the first user equipment and the second user equipment, and an indication of an area where the second user equipment is able to act as a relay node, wherein the area comprises a tracking area identity list;

providing an indication to the first user equipment that the second user equipment is authorised to act as a relay node for the first user equipment;

receiving data from the network addressed to the first user equipment at the second user equipment; and providing the data addressed to the first user equipment to the first user equipment from the second user equipment using the proximity service interface, wherein the data comprises replicated protocol data units, replicated control plane signalling, replicated user plane content, control plane signalling, user plane content, and non-priority protocol data units.

* * * * *